US008849939B2

(12) United States Patent
Wilkinson (10) Patent No.: US 8,849,939 B2
(45) Date of Patent: Sep. 30, 2014

(54) COORDINATING WRITE SEQUENCES IN A DATA STORAGE SYSTEM (75) Inventor: John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 13/309,587

(22) Filed: Dec. 2, 2011

(65) Prior Publication Data
US 2013/0145117 A1    Jun. 6, 2013

(51) Int. Cl.
G06F 15/167 (2006.01)
G06F 11/00 (2006.01)

(52) U.S. Cl.
USPC ........... 709/212; 711/161; 711/162; 711/165; 711/129; 711/114

(58) Field of Classification Search
USPC ......... 711/167, 124, 114, 154, 162, 100, 112, 711/113, 148
See application file for complete search history.

(56) References Cited

U.S. PATENT DOCUMENTS

| 6,745,285 | B2 * | 6/2004 | Howard et al. ............... 711/114 |
| 6,820,098 | B1 | 11/2004 | Ganesh et al. |
| 7,020,083 | B2 * | 3/2006 | Garcia-Luna-Aceves et al. ............................ 370/230 |
| 7,155,466 | B2 | 12/2006 | Rodriguez et al. |
| 7,200,111 | B2 * | 4/2007 | Garcia-Luna-Aceves et al. ............................ 370/230 |
| 7,565,498 | B1 * | 7/2009 | Baird et al. .................... 711/158 |
| 7,587,646 | B1 * | 9/2009 | Snethen et al. ............... 714/738 |
| 7,673,098 | B2 * | 3/2010 | Howard et al. ............... 711/114 |
| 7,774,568 | B2 | 8/2010 | Sudhakar |
| 7,823,008 | B2 | 10/2010 | Burr et al. |
| 2002/0078315 | A1 * | 6/2002 | Howard et al. ............... 711/162 |
| 2004/0220951 | A1 * | 11/2004 | Howard et al. ............... 707/100 |
| 2009/0240664 | A1 | 9/2009 | Dinker et al. |
| 2010/0070796 | A1 | 3/2010 | Sivaperuman et al. |
| 2011/0161302 | A1 | 6/2011 | Du et al. |

FOREIGN PATENT DOCUMENTS

CN    101334797    12/2008
CN    101539891    9/2009

OTHER PUBLICATIONS

International Search Report and Written Opinion; International Application No. PCT/IB2012/056479; Apr. 25, 2013.

* cited by examiner

Primary Examiner — Jude Jean Gilles
(74) Attorney, Agent, or Firm — James L. Baudino (57) ABSTRACT According to one aspect of the present disclosure, a system and technique for coordinating write sequences in a data storage system includes a processor configured to receive from a primary device, responsive to the primary device receiving a request to write to primary storage, a request for a sequence number. The system also includes a sequence generator configured to: generate a current sequence number for the write; generate a first identifier indicating an identity of secondary devices writing to secondary storage based on the current sequence number; generate a second identifier indicating an identity of secondary devices writing to secondary storage based on the current sequence number and a previous sequence number; transmit the current sequence number and the second identifier to the primary device; and transmit the current sequence number and the first identifier to the secondary devices writing to secondary storage based on the previous sequence number.

12 Claims, 5 Drawing Sheets

COORDINATING WRITE SEQUENCES IN A DATA STORAGE SYSTEM

BACKGROUND

Critical data is often copied to another storage site to protect against disasters that may result in data loss. One such technique for this purpose is known as remote copying where a disk (or logical volume) is paired with another disk for use as a backup. The original disk is known as the primary and the backup disk is known as the secondary. Whenever data is written to the primary it must also be written to the secondary to ensure the backup stays up to date. Remote copying may be implemented synchronously so that processing at the host is delayed until confirmation of the completion of the corresponding write at the secondary. Remote copying may be also implemented asynchronously such that the host that wrote the data to the primary storage is not delayed while data is copied to the secondary storage. That is, as soon as the data has been written to the primary storage, the host is notified of its completion. The data is then copied to the secondary storage asynchronously. In some instances, replicated writes in a set of related disks are assigned a sequence number according to the order the host submits them. The writes are replicated to a remote site or backup site and applied by sequence number order to ensure that the disks are always mutually consistent.

BRIEF SUMMARY

According to one aspect of the present disclosure a system, computer program product and technique for coordinating write sequences in a data storage system are disclosed. The system includes an input/output (IO) processor configured to receive from a primary device, responsive to the primary device receiving a request to write to primary storage, a request for a sequence number. The system also includes a sequence generator configured to: generate a current sequence number for the write; generate a first identifier indicating an identity of secondary devices writing to secondary storage based on the current sequence number; generate a second identifier indicating an identity of secondary devices writing to secondary storage based on the current sequence number and a previous sequence number; transmit the current sequence number and the second identifier to the primary device; and transmit the current sequence number and the first identifier to the secondary devices writing to secondary storage based on the previous sequence number.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method, system and computer program product for coordinating write sequences in a data storage system. For example, in some embodiments, the method and technique includes: responsive to a primary device receiving a request to write to primary storage, receiving from the primary device a request for a sequence number; generating a current sequence number for the write; generating a first identifier indicating an identity of secondary devices writing to secondary storage based on the current sequence number; generating a second identifier indicating an identity of secondary devices writing to secondary storage based on the current sequence number and a previous sequence number; transmitting the current sequence number and the second identifier to the primary device; and transmitting the current sequence number and the first identifier to the secondary devices writing to secondary storage based on the previous sequence number. Thus, in some embodiments of the present disclosure, the method and technique includes identifiers indicating which secondary devices are involved in a current sequence number write and which secondary devices were involved in a previous sequence number write. The identifiers are used to process the writes in the correct sequence while minimizing messaging between devices regarding completion of writes.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
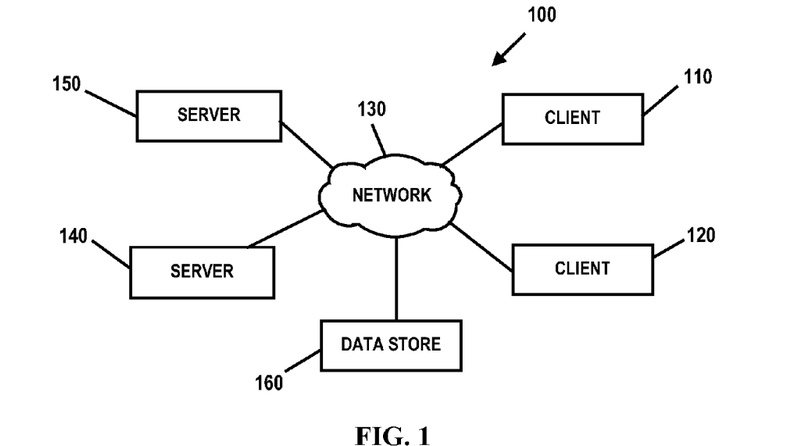
FIG. 1 is an embodiment of a network of data processing systems in which the illustrative embodiments of the present disclosure may be implemented.
Figure 2:
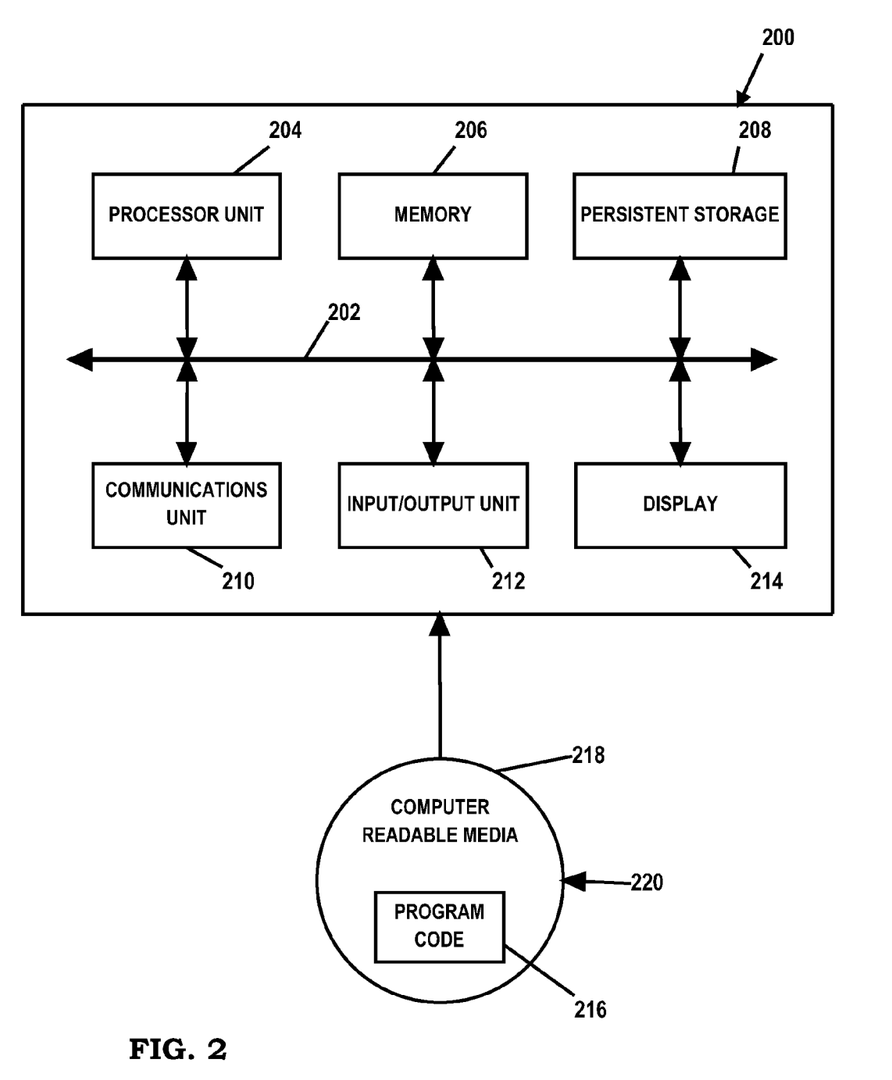
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN) or a storage area network (SAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for coordinating write sequences in a data storage system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
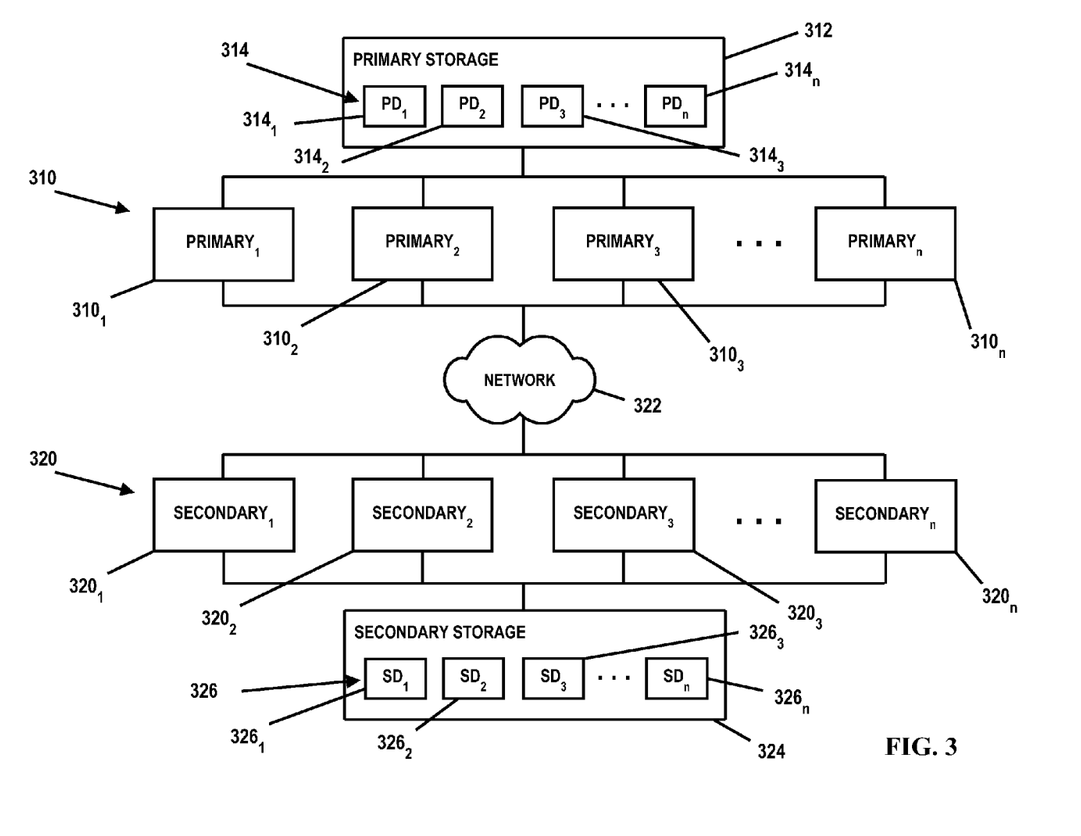
FIG. 3 is a diagram illustrating an embodiment of a data processing system for coordinating write sequences in a data storage system in which illustrative embodiments of the present disclosure may be implemented.

FIG. 3 is an illustrative embodiment of a system 300 for coordinating write sequences in a data storage system. System 300 may be implemented on data processing systems or platforms such as, but not limited to, servers 140 and/or 150, clients 110 and/or 120, or at other data processing system or node locations. In the embodiment illustrated in FIG. 3, system 300 comprises primary devices 310 for processing writes to primary storage 312. Primary devices 310 may comprise servers, clients or other types of data processing systems. In FIG. 3, system 300 includes primary devices $310_1, 310_2, 310_3$ through $310_n$ such that a quantity of primary devices may vary in system 300. Primary devices 310 present primary storage 312 such that primary storage 312 is made visible to external servers or data processing systems (e.g., servers 140 and 150, or clients 110 and 120) through one or more primary devices 310. Primary storage 312 may include a set of primary storage devices 314. Primary storage devices 314 may comprise, for example, optical or magnetic disks, tape storage or functional or structural equivalents thereof, without limitation. In FIG. 3, primary storage 312 includes primary storage devices 314 represented as $PD_1$ $314_1$, $PD_2$ $314_2$, $PD_3$ $314_3$ through $PD_n$ $314_n$ such that a quantity of primary storage devices 314 may vary in system 300.

In the embodiment illustrated in FIG. 3, system 300 also includes secondary devices 320 coupled to primary devices 310 via a wired or wireless communications network 322. Secondary devices 320 process writes to secondary storage 324. Secondary devices 320 may comprise servers, clients or other types of data processing systems. In FIG. 3, system 300 includes secondary devices $320_1, 320_2, 320_3$ through $320_n$ such that a quantity of secondary devices may vary in system 300. Secondary storage 324 may include a set of secondary storage devices 326. Secondary storage devices 326 may comprise, for example, optical or magnetic disks, tape storage or functional or structural equivalents thereof, without limitation. In FIG. 3, secondary storage 324 includes secondary storage devices 326 represented as $SD_1$ $326_1$, $SD_2$ $326_2$, $SD_3$ $326_3$ through $SD_n$ $326_n$ such that a quantity of secondary storage devices 326 may vary in system 300.

System 300 is configured to achieve consistent remote copy of data. The arrangement and location of primary devices 310 and secondary devices 320 shown in FIG. 3 is intended to be exemplary, and many other arrangements may be implemented, as for example only, locating primary devices 310 and secondary devices 320 at intermediate and communicating nodes of a data processing or communications network. A server or other data processing application may write to a set of primary storage devices 314 for which consistency of writes across primary storage 312 and secondary storage 324 is needed. Secondary devices 320 control secondary storage devices 326 such that each secondary storage device 326 is controlled by one or more secondary devices 320 and may be made visible to external servers or data processing applications through secondary devices 320 when access is needed (e.g., for disaster recovery). Data on primary storage 312 (e.g., primary storage devices 314) and the data written to primary storage 312 is replicated to secondary storage 324 (e.g., each primary storage device 314 or set of primary storage devices 314 may correspond to a respective secondary storage device 326 in secondary storage 324). Thus, in operation, each primary storage device 314 or set of primary storage devices 314 may map to a corresponding secondary storage device 326 in secondary storage 324. In some instances, writes need to be applied in a particular order across multiple storage devices (e.g., asynchronous remote replication). For example, in some embodiments, replicated writes in a set of related storage devices are assigned a sequence number according to the order a host submits them, replicated to remote storage, and applied by sequence number order in secondary storage, thereby ensuring that primary and secondary storage devices are mutually consistent.

Figure 4:
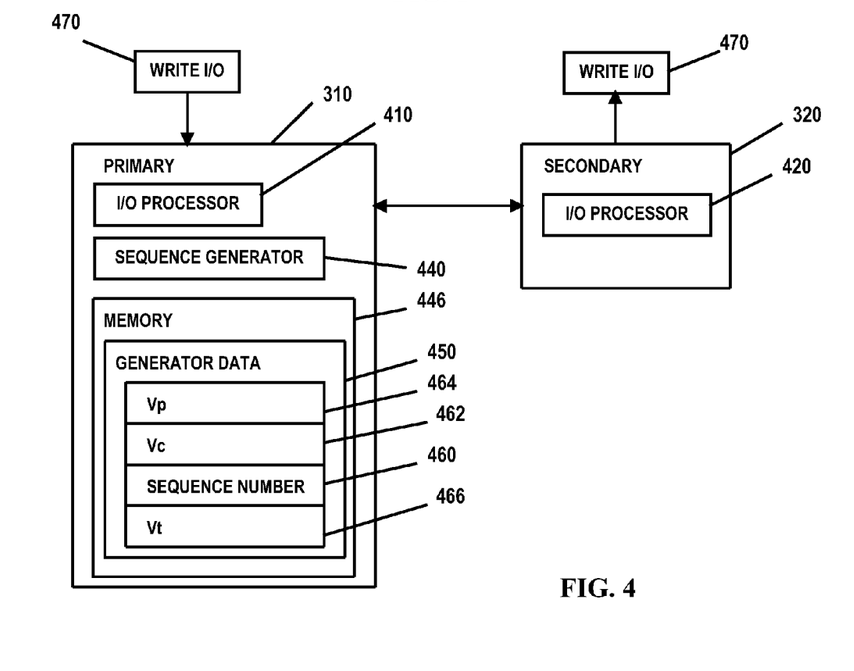
FIG. 4 is a diagram illustrating an embodiment of a data processing system for coordinating write sequences in a data storage system in which illustrative embodiments of the present disclosure may be implemented.

Referring to FIG. 4, there is shown an illustrative embodiment of primary device 310 and secondary device 320 of system 300. In the embodiment illustrated in FIG. 4, primary device 310 and secondary device 320 each comprise an input/output (IO) processor 410 and 420, respectively, for processing writes and/or performing various other data processing functions. In FIG. 4, primary device 310 includes a sequence generator 440. In some embodiments, sequence generator 440 resides on one primary device 310; however, it should be understood that there may be many such sequence generators 440 (e.g., each sequence generator 440 being used for a different set of primary storage devices 314 needing consistency across writes). In FIG. 4, primary device 310 also includes a memory 446 having generator data 450. Generator data 450 may comprise information generated, tracked and/or derived by sequence generator 440. For example, generator data 450 may include sequence number(s) 460. For example, a server or other data processing application writes to primary storage devices 314 of primary storage 312 where writes are distributed across primary storage devices 14 by such application. The writes are also distributed by the application across primary devices 310 according to which primary device 310 has access to the respective primary storage devices 314. In response to a primary device receiving a write 470, a request to generate a sequence number 460 is submitted to sequence generator 440. In FIG. 4, write 470 is illustrated as being received by a primary device having sequence generator 440; however, it should be understood that a write may be received by one primary device where sequencer generator 440 resides on a different primary device (e.g., write received by primary device $310_2$ and sequence generator 440 resides on primary device $310_3$). In such a case, primary device $310_2$ requests a sequence number 460 from primary device $310_3$. Sequence number 460 generally starts at zero and is incremented by one for each subsequent write. Sequence generator 440 may be implemented in any suitable manner that may be hardware-based, software-based, or some combination of both. For example, sequence generator 440 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In FIG. 4, generator data 450 also includes identifiers 462, 464 and 466 that are generated and/or otherwise derived by sequence generator 440. In some embodiments, identifiers 422, 464 and 466 comprise bit vectors (identified respectively as Vc, Vp and Vt in FIG. 4). In some embodiments bit vectors Vc 422, Vp 424 and Vt 466 are configured having a size or quantity of bits corresponding to the quantity of secondary devices 320 of system 300 such that each bit position/value of bit vectors Vc 422, Vp 424 and Vt 466 corresponds to a particular secondary device 320. Thus, the bits set in bit vectors Vc 422, Vp 424 and Vt 466 identify particular secondary devices 320. Vp 464 is used to identify which secondary devices 320 writes of the previous sequence number 460 were for, and Vc is used to identify which secondary devices 320 the writes of the current sequence number 460 are for. Vt 466 is a bitwise OR of Vc 462 and Vp 464 (e.g., in C programming language, Vc|Vp).

In operation, a primary device 310 receiving a write sends a message to sequence generator 440, including which secondary device 320 the write will need to be sent to, requesting a sequence number 460. Initially, Vp 464 and Vc 462 may be unset, and sequence number ("N") 460 starts at zero. Sequence generator 440 collates the outstanding requests for sequence numbers that have been sent to it from different primary devices 310 and sets bits appropriately in Vc 462 according to the secondary device 320 each write is to be sent to. Sequence generator 440 also generates Vt 466 being the total set of secondary devices 320 that will be involved in the current sequence number. Sequence generator 440 replies to each primary device 310 (e.g., via IO processor 410) that requested a sequence number, for each write it requested a sequence number for, with a message containing the current sequence number 460 and Vt 466. Sequence generator 440 also transmits a pseudo-write message to each secondary device of Vp 464 not in Vc 462 (e.g., in C programming language, Vp & (~Vc)) containing the current sequence number 460 and Vc 462 (instead of Vt 466).

In response to receiving the current sequence number 460 and Vt 466, the primary device 310 that requested the sequence number 460 commits the write to primary storage 312 and sends the write, together with the values of the current sequence number 460 and Vt 466 to a secondary device 320 with access to the corresponding secondary storage devices 326 of secondary storage 324. For example, a corresponding secondary device 320 needs to determine when it may process its corresponding write. Initially, any secondary device 320 may process writes with sequence numbers of zero as there are no earlier writes the secondary devices 320 can depend on. Thereafter, the secondary devices 320 will receive either one or more writes with a current sequence number (e.g., N=1) or a pseudo-write message with the current sequence number (e.g., N=1). After processing each write of a particular sequence number, a secondary device 320 will send sequence-number-done message to a set of the secondary devices 320. For example, if a secondary device 320 has received writes where N=1 and has completed all writes where N=0, the set of secondary devices 320 receiving the sequence-number-done message are the secondary devices identified by Vt 466 of the writes where N=1 (all such writes will contain the same Vt 466). If a secondary device 320 has received a pseudo-write message where N=1 and has completed all writes where N=0, the set of secondary devices 320 receiving the sequence-number-done message are the secondary devices identified by Vc 462 contained in that pseudo-write message. When a secondary device 320 having received writes where N=1 and has received sequence-number-done messages from secondary devices 320 for which bits are set in Vt 466 of those writes, the secondary device 320 may commit the write 470 to secondary storage 324 where N=1 (e.g., because all the writes that sequence number N=1 can depend on for consistency have already been processed).

In some instances, where Vt 466 only has a single bit set (e.g., a single secondary device 320) which may happen often during peaks of write workload, no messaging between secondary devices is needed as only the single secondary device 320 represented by the single bit set in Vt 466 is responsible for determining that it can move from one sequence number to the next, thereby enabling a fast, synchronous operation with rapid processing of the writes. Where Vt 466 contains multiple set bits (e.g., multiple secondary devices 320 identified), the maximum length of time between the last secondary device 320 to complete the writes of a sequence number to all secondary devices 320 being able to process the writes of the next sequence number is the time taken for a message to travel one way between the two most distant secondary devices 320.

Figure 5:
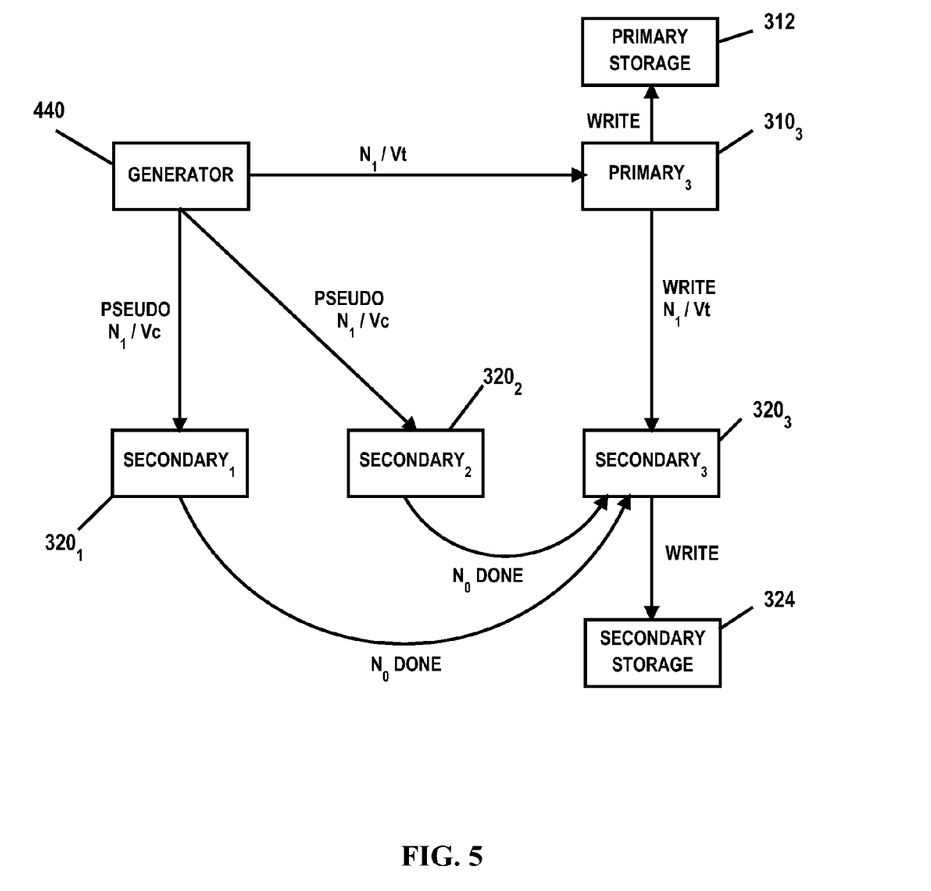
FIG. 5 is a diagram illustrating an embodiment of a system for coordinating write sequences in a data storage system in which illustrative embodiments of the present disclosure may be implemented.

FIG. 5 is a diagram illustrating a system and method for coordinating write sequences in accordance with the present disclosure. In the illustrated embodiment, primary device 310₃ has received a write and requested a sequence number from sequence generator 440. The request for the sequence number also includes the identity of the secondary device involved in the current write (in this example, secondary device 320₃). The current sequence number assigned to the write requested by primary device 310₃ is $N_1$. The previous sequence number (represented by $N_0$) for a write involved secondary devices 320₁ and 320₂. In operation, in response to receiving the request for a sequence number by sequence generator 440, sequence generator 440 sets bits in Vc 462 corresponding to the current sequence number $N_1$ (the bits set identifying secondary device 320₃). Sequence generator 440 also sets bits in Vp 464 corresponding to secondary devices involved in a write based on the previous sequence number $N_0$ (e.g., in some instances, the previous value of Vc 462 may be used as the current value for Vp 464). Sequence generator 440 also generates Vt 466 (e.g., by performing an OR function on Vc 462 and Vp 464). Sequence generator 440 transmits the current sequence number $N_1$ to primary device 310₃ along with Vt 466. Sequence generator 440 also transmits a pseudo-write message to secondary devices involved in the previous sequence number $N_0$ (e.g., secondary devices identified by the bits set in Vp 464). The pseudo-write message includes the current sequence number N1 along with Vc 462 (which identifies the secondary devices involved in the current sequence number write).

Primary device 310₃ commits the write to primary storage 312 and transmits the write, along with the current sequence number $N_1$ and Vt 466, to the secondary device having access to the corresponding secondary storage devices 326 for the write (e.g., secondary device 320₃). Secondary devices 320₁ and 320₂, upon completion of the writes for the previous sequence number $N_0$, transmit a sequence-number-done message to secondary devices involved in the current sequence number $N_1$ write (e.g., derived from Vc 462 received by secondary devices 320₁ and 320₂ from sequence generator 440). Secondary device 320₃, upon receiving the sequence-number-done message from secondary devices involved in the previous sequence number $N_0$ write (which may be derived by secondary device 320₃ from Vt 466), secondary device 320₃ commits the write for the current sequence number $N_1$ to secondary storage 324.

Figure 6:
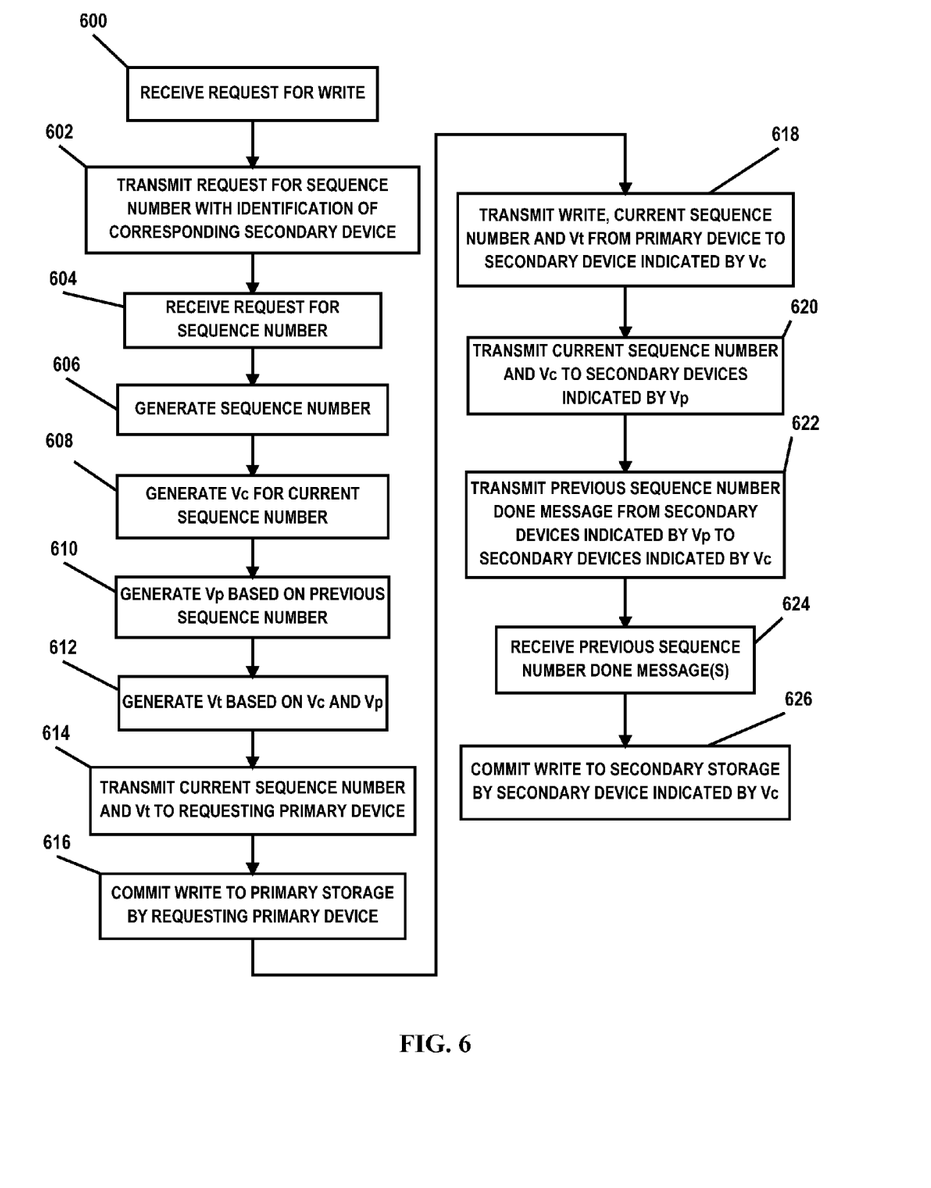
FIG. 6 is a flow diagram illustrating an embodiment of a method for coordinating write sequences in a data storage system according to the present disclosure.

FIG. 6 is a flow diagram illustrating an embodiment of a method for coordinating write sequences. The method begins at block 600, where a particular primary device 310 receives a write. At block 602, primary device 310 transmits a request for a sequence number along with an indication of the corresponding secondary device 320 for the write to sequence generator 440. At block 604, sequence generator 440 receives the sequence number request. At block 606, sequence generator 440 generates a current sequence number for the write. At block 608, sequence generator 440 generates Vc 462 for the current sequence number. At block 610, sequence generator 440 generates Vp 464 based on the previous sequence number. At block 612, sequence generator 440 generates Vt 466 based on Vc 462 and Vp 464.

At block 614, sequence generator 440 transmits the current sequence number and Vt 466 to the requesting primary device 310. At block 616, the primary device 310 commits the write to primary storage 312. At block 618, the primary device 310 transmits the write, the current sequence number and Vt 466 to the corresponding secondary device 320 (e.g., the secondary device 320 indicated by Vc 462). At block 620, sequence generator 440 transmits the current sequence number and Vc 462 to secondary devices 320 involved in the previous sequence number (e.g., secondary devices 320 indicated by Vp 464). At block 622, the secondary devices 320 involved in the previous sequence number write transmit a previous sequence number done message to secondary devices 320 involved in the current sequence number write (e.g., secondary devices 320 indicated by Vc 462). At block 624, the secondary devices 320 involved in the current sequence number write receives the previous sequence number done messages from secondary devices 320 involved in the previous sequence number write. At block 626, in response to receiving all previous sequence number done messages (e.g., verifying receipt of a sequence number done message from each secondary device 320 besides itself as indicated by Vt 466), the secondary device 320 involved in the current sequence number write commits the write to secondary storage 324.

Thus, embodiments of the present disclosure enable a more efficient sequencing of writes by reducing bandwidth. For example, embodiments of the present disclosure enable processing of writes in the correct sequence while reducing messaging between devices. Further, embodiments of the present disclosure enable processing of writes in the correct sequence for any number of devices while requiring no messaging to other devices when any adjacent pair of sequence numbers only contain writes for particular secondary devices.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for coordinated sequencing of writes, comprising:
    an input/output (JO) processor configured to receive from a primary device, responsive to the primary device receiving a request to write to primary storage, a request for a sequence number; and
    a sequence generator configured to:
        generate a current sequence number for the write;
        generate a first identifier indicating an identity of secondary devices writing to secondary storage based on the current sequence number;
        generate a second identifier indicating an identity of secondary devices writing to secondary storage based on the current sequence number and a previous sequence number;
        transmit the current sequence number and the second identifier to the primary device; and
        transmit the current sequence number and the first identifier to the secondary devices writing to secondary storage based on the previous sequence number.

2. The system of claim 1, wherein the primary device is configured to transmit to secondary devices writing to secondary storage based on the current sequence number the write, the current sequence number, and the second identifier.

3. The system of claim 2, wherein the secondary devices writing to secondary storage based on the previous sequence number are configured to transmit to secondary devices writing to secondary storage based on the current sequence number a write done message indicating completion of a write based on the previous sequence number.

4. The system of claim 1, wherein the first identifier comprises as a bit vector, wherein each bit position of the bit vector corresponds to a particular secondary device.

5. The system of claim 1, wherein the first and second identifiers comprise bit vectors, wherein each bit position of a respective bit vector corresponds to a particular secondary device.

6. The system of claim 4, wherein the bit vector comprises a quantity of bits corresponding to a quantity of secondary devices.

7. The system of claim 3, wherein, responsive to the secondary device receiving the write done message from each secondary device writing to secondary storage based on the previous sequence number, committing the write for the current sequence number to secondary storage.

8. A computer program product for coordinated sequencing of writes, the computer program product comprising:
    a computer readable storage medium having computer readable program code embodied therewith, the computer readable program code comprising computer readable program code configured to:
        responsive to a primary device receiving a request to write to primary storage, receive from the primary device a request for a sequence number;
        generate a current sequence number for the write;
        generate a first identifier indicating an identity of secondary devices writing to secondary storage based on the current sequence number;
        generate a second identifier indicating an identity of secondary devices writing to secondary storage based on the current sequence number and a previous sequence number;
        transmit the current sequence number and the second identifier to the primary device; and
        transmit the current sequence number and the first identifier to the secondary devices writing to secondary storage based on the previous sequence number.

9. The computer program product of claim 8, wherein the computer readable program code is configured to cause the primary device to transmit to secondary devices writing to secondary storage based on the current sequence number the write, the current sequence number, and the second identifier.

10. The computer program product of claim 9, wherein the computer readable program code is configured to cause the secondary devices writing to secondary storage based on the previous sequence number to transmit to secondary devices writing to secondary storage based on the current sequence number a write done message indicating completion of a write based on the previous sequence number.

11. The computer program product of claim 8, wherein the computer readable program code is configured to configure the first identifier as a bit vector, wherein each bit position of the bit vector corresponds to a particular secondary device.

12. The computer program product of claim 11, wherein the computer readable program code is configured to configure the bit vector having a quantity of bits corresponding to a quantity of secondary devices.

* * * * *